United States Patent
Ragland et al.

(10) Patent No.: US 6,823,571 B1
(45) Date of Patent: Nov. 30, 2004

(54) APPARATUS AND METHOD FOR MANUFACTURE OF MULTILAYER METAL PRODUCTS

(75) Inventors: G. William Ragland, Dunwoody, GA (US); J. Bradley Pearce, Snellville, GA (US); Christopher V. Ragland, Lawrenceville, GA (US)

(73) Assignee: ATD Corporation, Suwanee, GA (US)

( * ) Notice: Subject to any disclaimer, the term of this patent is extended or adjusted under 35 U.S.C. 154(b) by 0 days.

(21) Appl. No.: 09/490,259

(22) Filed: Jan. 24, 2000

(51) Int. Cl.[7] .......................... B32B 31/20; B32B 31/00; B32B 31/04
(52) U.S. Cl. .......................... 29/17.4; 29/17.2; 29/17.3; 29/17.7; 270/39.01; 270/39.05; 270/39.07; 428/183; 428/184; 428/186
(58) Field of Search ................................ 29/17.1, 17.2, 29/17.3, 17.4, 17.7; 270/39.01, 39.05, 39.07, 41; 428/603, 182–187

(56) References Cited

U.S. PATENT DOCUMENTS

| 574,157 | A | * | 12/1896 | Ljungstrom |
| 1,051,503 | A | | 1/1913 | Klein |

(List continued on next page.)

FOREIGN PATENT DOCUMENTS

| DE | 19803837 A1 | 8/1999 | |
| EP | 0 844 078 A2 | 5/1998 | |
| GB | 783184 | 9/1957 | |
| GB | 2 326 117 | 12/1998 | ............. B31B/3/28 |

OTHER PUBLICATIONS

PCT/US01/02259—Search Report.

*Primary Examiner*—Eric Compton

(57) ABSTRACT

Apparatus for manufacturing multi-layer metal feedstock material for stamping shaped parts eliminates the need for rolls of metal at the stamping site. Multilayer metal feedstock material is assembled from multiple rolls of metal stock, then folded in a zig zag fashion, or "Z-fold" configuration, whereby the multilayer metal assembly is stacked vertically, usually on conventional pallets, for ease of moving with a forklift or otherwise. The multilayer metal z-fold stack of material is then transported to a parts stamping operation where the material is used as it unfolds as a continuous feed to machines to produce shaped multilayer metal parts. This invention is most useful in making multilayer metal foil z-fold feedstock material and using the z-fold material as continuous feed to processes for making shaped multilayer metal foil parts. The layers may have non-metal layers of material, such as fiber, between the metal layers or on the outside of the metal layers. At the location of making the shaped parts from the feedstock material, the layers of the z-fold feedstock material may be separated and one or more of the layers treated, textured, embossed, etc., then reassembled into the stack which is fed to the stamping operation, all on a continuous basis. This enables the z-fold feedstock material to be made from smooth metal layers, which increases the density of the material and reduces the volume space required for storage of the z-fold material.

21 Claims, 3 Drawing Sheets

U.S. PATENT DOCUMENTS

| | | | | |
|---|---|---|---|---|
| 1,489,833 A | * | 4/1924 | Keller | |
| 1,497,296 A | * | 6/1924 | Jappe (Stevenson) | |
| 2,411,075 A | * | 11/1946 | Wyrick | |
| 3,151,712 A | | 10/1964 | Jackson | 189/34 |
| 3,424,145 A | | 1/1969 | Stitt | 126/25 |
| 3,966,646 A | * | 6/1976 | Noakes et al. | |
| 4,218,962 A | | 8/1980 | Cunningham et al. | |
| 4,318,965 A | | 3/1982 | Blair | 428/593 |
| 4,348,450 A | * | 9/1982 | Shaw | 428/182 |
| 4,386,128 A | | 5/1983 | Yoshikawa | 428/152 |
| 4,401,706 A | | 8/1983 | Sovilla | 428/158 |
| 4,402,871 A | * | 9/1983 | Retallick | |
| 4,418,678 A | | 12/1983 | Erickson | 126/9 |
| 4,434,781 A | | 3/1984 | Koziol | 126/25 |
| 4,461,665 A | * | 7/1984 | Schertler | 428/182 |
| 4,530,230 A | * | 7/1985 | Monks | |
| 4,533,583 A | | 8/1985 | May | 428/69 |
| 4,619,612 A | * | 10/1986 | Weber et al. | |
| 4,647,435 A | * | 3/1987 | Nonnenmann | |
| 4,673,553 A | | 6/1987 | Retallick | |
| 4,684,020 A | * | 8/1987 | Ohlbach | |
| 4,711,009 A | * | 12/1987 | Cornelison et al. | |
| 4,748,792 A | * | 6/1988 | Jeffrey | |
| 4,765,047 A | | 8/1988 | Retallick | |
| 4,867,821 A | | 9/1989 | Morgan | |
| 4,950,524 A | * | 8/1990 | Hacker | 428/182 |
| 5,025,649 A | | 6/1991 | Retallick | |
| 5,063,769 A | | 11/1991 | Retallick | |
| 5,244,745 A | | 9/1993 | Seksaria et al. | 428/593 |
| 5,524,406 A | | 6/1996 | Ragland | 52/406 |
| 5,582,094 A | | 12/1996 | Peterson et al. | 99/445 |
| 5,633,064 A | | 5/1997 | Ragland et al. | |
| 5,763,857 A | | 6/1998 | Klement et al. | 219/407 |
| 5,785,931 A | * | 7/1998 | Maus et al. | |
| 5,800,905 A | * | 9/1998 | Sheridan et al. | 428/603 |
| 6,129,800 A | | 10/2000 | Brinley | |
| 6,139,938 A | * | 10/2000 | Lingle et al. | 428/182 |
| 6,150,007 A | * | 11/2000 | Oshima et al. | 428/187 |
| 6,276,044 B1 | * | 8/2001 | Ragland et al. | |
| 6,391,469 B1 | * | 5/2002 | Ragland et al. | |

* cited by examiner

APPARATUS AND METHOD FOR MANUFACTURE OF MULTILAYER METAL PRODUCTS

FIELD OF THE INVENTION

This invention relates to multilayer metal foil insulating and shielding products which have both thermal and acoustical insulation and shielding utilities.

BACKGROUND OF THE INVENTION

Multilayer metal foil products are known in the art for heat and acoustical insulation and shielding. One class of such products are generally known as "all metal" shielding and insulation products made from multiple layers of metal foils. Although referred to as all metal heat shields and heat insulation products, it is commonly understood that such products may contain various other materials interspersed between the foil layers such as fibers, adhesives, scrim layer and the like. An example of all metal heat shields is disclosed in U.S. Pat. No. 5,800,905 which discloses multiple layers of metal foils configured in spaced apart layers to provide heat shielding products for the automotive industry and other uses. Another example of such products is disclosed in U.S. Pat. No. 5,958,603 which is directed to similar multilayer metal foil heat shield and insulation products but which are formed as integral products having independent structural strength due to structural features such as a rolled edge which combines all the layers into a fixed rigid structural configuration. Another example of similar multilayer metal products is disclosed in U.S. Pat. No. 5,939,212 which is directed to multilayer metal foil products which are corrugated in nature and which may be formed into flexible or stand-alone structural members by interlocking the corrugations of the multiple metal foil layers together. Multilayer metal foil heat insulation and shielding members are also useful in the food preparation devices, such as those illustrated in U.S. Pat. No. 5,406,930 and in pending U.S. patent application Ser. No. 09/422,140. The disclosures of the above patents and patent application are incorporated herein by reference in their entirety.

Another category of multilayer metal foil heat insulation and shielding products are those which include as a significant or major portion of the layered product fibrous insulation materials. Examples of these multilayer metal foil products containing layers of fibrous materials are shown in U.S. Pat. No. 5,658,634 and U.S. Pat. No. 5,767,024. Typically these types of multilayer metal foil shields having significant fiber content are used in lower temperature applications than the above "all-metal" type products. The disclosures of the above patents are incorporated herein by reference in their entirety.

While the manufacture of the above multilayer metal foil insulation and shielding products is well-known, there is a need for increased efficiency and increased flexibility in the manufacturing processes which can be used for production of those products.

SUMMARY OF THE INVENTION

This invention provides new and improved manufacturing methods and manufacturing apparatus for production of multilayer metal foil insulation and shielding products. The present inventions are useful in the production of both the "all-metal" type products as well as fiber containing products. The present inventions also include certain new and novel multilayer metal foil products themselves.

In one aspect this invention provides a method of forming a multilayer metal foil product comprising providing a continuous stack of metal foil layers; separating at least two of the layers of the stack; imparting a pattern or surface treatment to at least one of said separated layers of metal foil; recombining the separated metal foil layers into a continuous stack of metal foil layers; and forming and cutting individual multilayer metal foil parts from said recombined continuous stack of metal foil layers. In this method of the invention each layer of the stack of metal foils can be either smooth or can be individually previously patterned with embossments, corrugations or other desired patterns. In this method, the stack of metal foil layers is separated usually into individual layers for the purpose of treating each individual layer with either patterns, such as embossments or corrugations, or surface treatment of each layer such as with adhesives or other materials. Once the individual layers are patterned or treated as desired, the layers are recombined into the continuous stack of metal foil layers, which continuous stack is then used for forming and cutting individual multilayer metal foil parts and devices from the recombined continuous stack of metal foil layers. As will be recognized from the disclosure herein, the initial continuous stack of metal foil layers may also comprise intermediate layers of fiber material or other desired materials, or alternatively, once the individual metal foil layers are separated in the process of this invention, the additional layers, such as fiber layers can be inserted between the separated metal foil layers before the separated layers are recombined into the continuous stack of metal foil layers used for cutting and forming individual multilayer metal foil parts.

In another aspect of this invention an apparatus is provided for producing and a multilayer metal foil product comprising a separator for receiving a continuous multilayer stack of metal foil layers and separating at least two layers of said stack; a tool for imparting a pattern or surface treatment to at least one of said layers of metal foil; a feeder for feeding the separated layers through a slot for recombining the layers into a continuous multilayer stack of metal foil layers; and a second tool for receiving the recombined multilayer stack and for forming and cutting individual multilayer metal foil parts from said stack. The above apparatus is adapted to separate the layers of the metal foil stack, treat certain layers by surface treatment or patterns, such as embossments or corrugations, and recombining the layers into the stack of metal foil layers and finally, forming and cutting individual multilayer metal foil parts from the recombined stack of layers. The apparatus can optionally include additional intermediate feeder for inserting and feeding an additional layer of material into the stack between the separated layers before the separated layers are recombined into the continuous stack for forming and cutting individual parts from the stack.

In another aspect this invention provides a method of forming a multilayer metal foil product comprising providing a continuous stack comprising patterned and nested metal foil layers; separating at least two of the nested layers of the stack; recombining the separated metal foil layers into a continuous stack of the metal foil layers in a manner to prevent the layers from nesting; and forming and cutting individual multilayer metal foil parts from said recombined stack of metal foil layers. In this aspect of the invention, the nested preformed patterned layers are separated and recombined in a non-nested form to provide gaps between the metal foil layers before the multilayer stack is used to form and cut individual multilayer metal foil parts from the recombined stack of spaced apart metal foil layers. In this aspect of the invention, the continuous stack of patterned and nested metal foil layers is provided by combining multiple layers of smooth metal foil into a stack and then embossing or corrugating or otherwise forming a patterned texture in all of the layers of the stack at the same time, which results in the stack of patterned metal foil layers being nested. Such a stack of metal foil layers is then subjected to the above method of separating the layers and recombining the layers in a manner to prevent the layers from nesting. Such a method can include offsetting the patterns of each individual layer from the similar patterns of an adjacent layer to prevent the layers from nesting. Then the layers are recombined into the multilayer stack for forming and cutting individual multilayer metal foil parts from the recombined stack.

In another aspect, this invention provides apparatus for producing a multilayer metal foil product comprising a separator for receiving a continuous nested stack of patterned metal foil layers and separating at least two layers of said stack; a tool for offsetting the separated layers to prevent nesting of the layers when recombined into a stack; a feeder for feeding the separated layers through a slot for recombining the layers into a continuous stack of metal foil layers; and a second tool for receiving the recombined stack and for forming and cutting individual multilayer metal foil parts from said stack.

In another aspect, this invention provides a method of producing a multilayer metal foil product comprising combining a plurality of continuous metal foil layers to form an advancing continuous stack of metal foil layers; scoring or creasing the advancing continuous stack of metal foil layers across at least a portion of the width of the stack at predetermined intervals along the length of the continuous stack; causing the continuous stack of metal foil layers to fold in alternating directions at said scores or creases; and piling the alternately folding stack in a zigzag fashion to form a z-fold pack of the continuous stack of metal foil layers. In this aspect of the invention, the method is provided to provide a new form of feedstock for various operations manufacturing multilayer metal parts and products, particularly multilayer metal foil parts and products. Conventionally, such multilayer metal foil parts and products have been formed from multiple layers of metal foils where each layer of metal foil is supplied into the manufacturing process from a metal foil roll. The present method of this invention provides a method of making a multilayer metal foil raw material which can be supplied to manufacturing operations where multilayer metal foil parts and products are formed and shaped. The multilayer metal foil continuous stack formed into the z-fold pack according to this invention is useful in those manufacturing operations which are not equipped to handle rolls of individual metal foil layers.

In another aspect, this invention provides an apparatus for producing a multilayer metal foil product comprising a plurality of feeders for feeding a plurality of continuous metal foil layers to a collection slot; a collection slot positioned to receive the plurality of continuous metal foil layers therethrough to form a continuous multilayer stack of said metal foil layers and positioned to pass the continuous stack to a tool; a tool for receiving the continuous stack and laterally scoring or creasing the continuous stack of said layers across at least a portion of its width at predetermined intervals along its length and causing the continuous stack of said layers to fold in alternating directions at said intervals into a pile; and a support member positioned for receiving the pile of the folding continuous stack of said metal foil layers from said tool to form a z-fold pack of folded continuous stack of metal foil layers.

In another aspect, this invention provides a multilayer metal foil product comprising a plurality of continuous metal foil layers having a width X and formed in a multilayer stack wherein the continuous multilayer stack of metal foil layers is folded across width X at intervals Y in alternating directions, is piled in a zigzag fashion in the form of a pack of a continuous multilayer metal foil stack, said pack having a width X, a length Y and a height H determined by a preselected desired length of the z-folded continuous multilayer stack of metal foil layers or a preselected desire height of the z-fold pack to make it suitable for shipping and handling at the parts manufacturing operation.

In another aspect, this invention provides a method of producing multilayer metal foil parts comprising feeding to a parts forming operation a continuous multilayer stack of metal foil layers from a z-fold pack of a continuous multilayer stack of metal foil layers; and forming and cutting individual multilayer metal foil parts from said stack of metal foil layers.

The above aspects of this invention are more fully explained in reference to the drawings and general disclosure herein.

DESCRIPTION OF THE INVENTION

The various aspects of the present invention can best be understood by reference to the drawings and the following disclosure.

Figure 1:
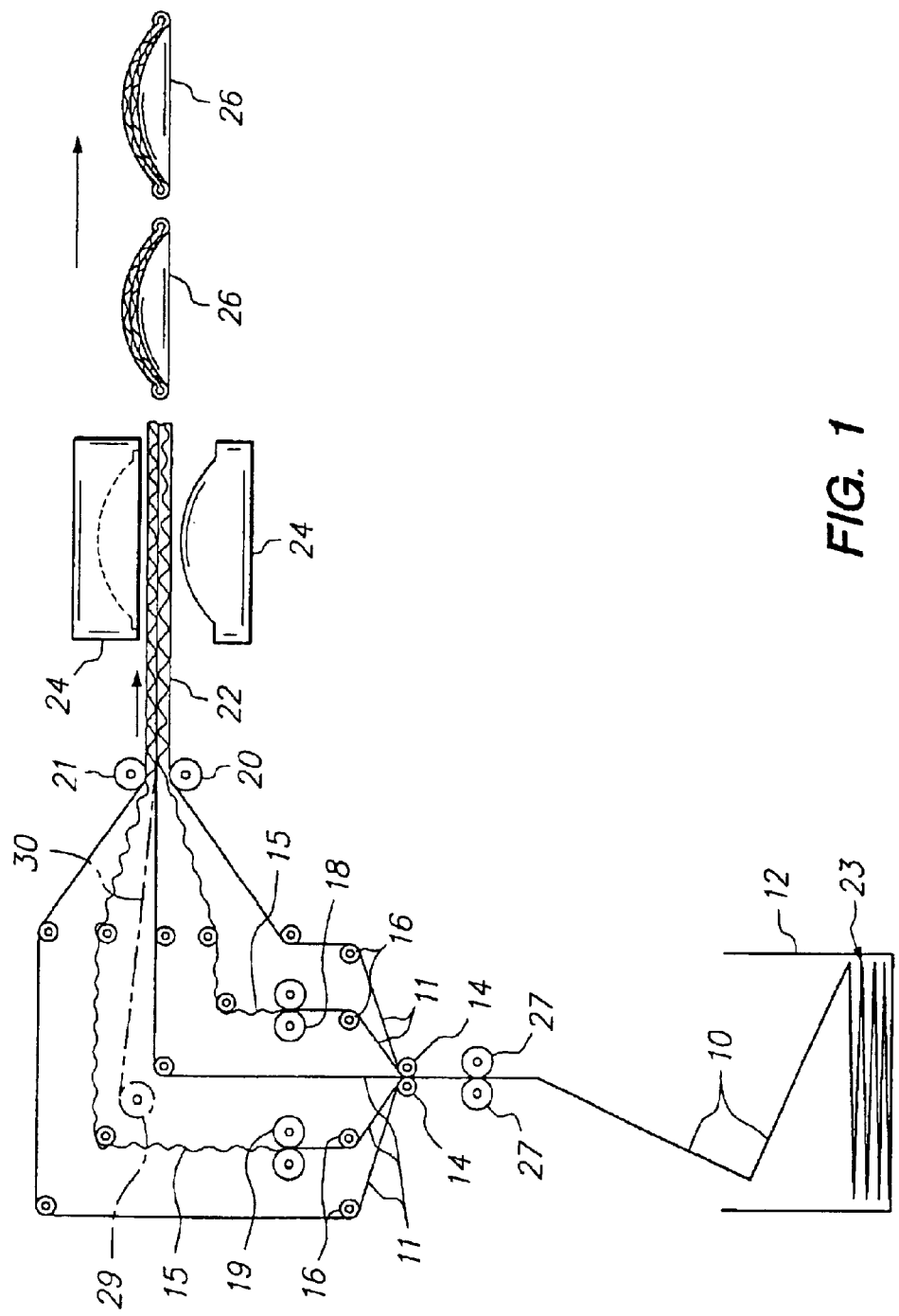
FIG. 1 is a cross-section illustration of the aspect of this invention wherein individual multilayer metal foil parts and products are formed from a continuous multilayer stack of metal foil layers.

FIG. 1 illustrates in cross-section form the aspect of this invention wherein a multilayer metal foil stack 10 is separated by a separation tool comprising rollers 14 and 16 to separate the multilayer stack of metal foils 10 into separate and individual metal foil layers 11. The purpose of separating the multilayer stack of metal foils is to enable treatment or processing of some or all of the layers before the metal foil layers are reassembled and recombined into a multilayer stack of metal foils for production of multilayer metal foil parts and products. For example, as illustrated in FIG. 1, corrugation rollers 18 and 19 are used to form corrugated layers 15 as two of the five layers which are then recombined at the slot between rollers 20 and 21 to form the multilayer metal foil stack comprising three smooth layers of metal foil and two corrugated layers of metal foil. The recombined multilayer stack of metal foils 22 is then fed to stamping and cutting tool 24 which produces individual multilayer metal foil parts 26.

In the illustration shown in FIG. 1, a five layer stack of metal foils is illustrated. However, it will be understood that any number of layers of metal foil from two layers to as many layers which one skilled in the art deems appropriate for the particular multilayer metal foil end product being produced. Likewise, it will be recognized that in addition to at least two metal foil layers in the multilayer stack, various other layers of materials can be inserted between the metal foil layers or added to the outside of the multilayer stack of metal foil layers. For example, as illustrated in FIG. 1, optional roll 29 can be inserted to add an additional layer 30, thus resulting in a six layer stack, which is then fed to stamping tool 24 to produce parts 26. Optional layer 30 can be selected to provide any properties to be exhibited by the end product. For example, layer 30 can be fiber, a plastic film, adhesive, scrim, or other material. Similarly, the initial supply of the multilayer metal foil stack 10 can initially contain any combination of metal foil layers, layers of other materials, such as fiber, adhesive, plastic, etc. Further, continuous multilayer stack 10, or the recombined continuous multilayer stack 22 can contain one or more layers of metal sheet, which is thicker than the metal foil layers. For example, the multilayer stack of metal foils and other materials, 10, can comprise five metal foil layers, or as many metal foil layers as desired, or could comprise two metal foil layers, two fibrous layers, and an adhesive layer either internally or externally, depending on the end use application for which the final individual parts and products are to be utilized. Additionally, the multilayer stack can comprise one or more metal sheets for structural strength of the final formed part 26.

Another optional aspect illustrated in FIG. 1 comprising part of this invention is illustrated at roll pattern tool 27 which optionally can be used to impart a pattern such as embossments or corrugations in the multilayer metal foil stack 10 prior to the layers being separated for further treatment. It will also be understood that in place of or in addition to pattern tool 27, the initial supply of multilayer metal foil stack 10 can previously have been patterned, such as embossed, corrugated or otherwise prior to being supplied to the process and apparatus illustrated in FIG. 1.

The products 26 produced by the method and apparatus illustrated in FIG. 1 include products like those disclosed and illustrated in U.S. Pat. Nos. 5,800,905; 5,958,603; 5,939,212; 5,406,930; 5,658,634 and 5,767,024, and in U.S. patent application Ser. No. 09/422,140, the disclosures of which patents and patent application are incorporated herein by reference in their entirety. By reference to these patents, it will be apparent that not only the types of "all-metal" multilayer metal foil products which can be produced in the method and apparatus illustrated in FIG. 1, but it will be equally apparent, the types of metal foil/fiber-layer products which can likewise be produced by the method and apparatus illustrated in FIG. 1 according to this invention. Likewise, one skilled in the art selecting a product disclosed in the above patents and patent application for manufacture in accordance with this invention as illustrated in FIG. 1 will find it apparent as to the make-up of the multilayer metal foil stack 10 or stack 22, which will be required to produce a desired product according to the disclosures of said patents and patent application.

In reference to FIG. 1, it will likewise be apparent to one skilled in the art that the separator illustrated in FIG. 1 for separating the layered continuous stack of metal foil layers is shown as rollers 14 and 16, but various other configurations of mechanical separator can be utilized for separating the layers of the metal foil stack 10. It will further be apparent to one skilled in the art, that the tools 18 and 19 for imparting patterns or surface treatment to one or more layers of the metal foil or to other fibrous, plastic or other layers making up the multilayer stack 10, from which parts are to be formed. It will be apparent to one skilled in the art with respect to the tools required to produce the desired various layers to form part of the final stack 22 from which the parts 26 are formed and cut. The slot for recombining the layers after they have been textured or treated and combining any additional optional layers is illustrated in FIG. 1 as the space between rollers 20 and 21. However, it will be recognized by one skilled in the art that the slot for recombining the separated layers into the final multilayer stack 22 for making parts and products can constitute a slot or gap between any desired type of members such as bars, rods, rollers, etc.

In another aspect of this invention, a modified method and apparatus illustrated in FIG. 1 can be used wherein the continuous stack of metal foil layers 10 are all pre-embossed simultaneously, such that the embossments or corrugations extend through all of the nested layers of the stack 10, and the function of separating the nested textured layers is to offset or otherwise treat the separated layers such that they do not nest when they are recombined, such as at the slot between rollers 20 and 21, into multilayer stack 22. In one such a product produced by the method and apparatus illustrated in FIG. 1, all layers of the stack 10 would be identical and all layers in recombined stack 22 would be identical except they would be positioned so that they would not nest and would retain gaps between the layers to provide the desired insulating and shielding properties desired in the final products 26. As will be appreciated by one skilled in the art, by reference to the above indicated patents and patent application, the combination of various layers, thickness of layers, types of materials, and dimensions of the layers are infinitely possible depending on the final products desired and the performance and properties desired in those final products. Likewise, it will be apparent to one skilled in the art that the products of various end utility such as automotive, heat shielding and insulation, acoustical shielding and insulation, heat insulation in cooking devices, etc. can be designed and an appropriate method and apparatus of this invention, such as illustrated and exemplified in FIG. 1, can be utilized to make those multilayer heat and sound insulation and shielding products.

Figures 2, 3:
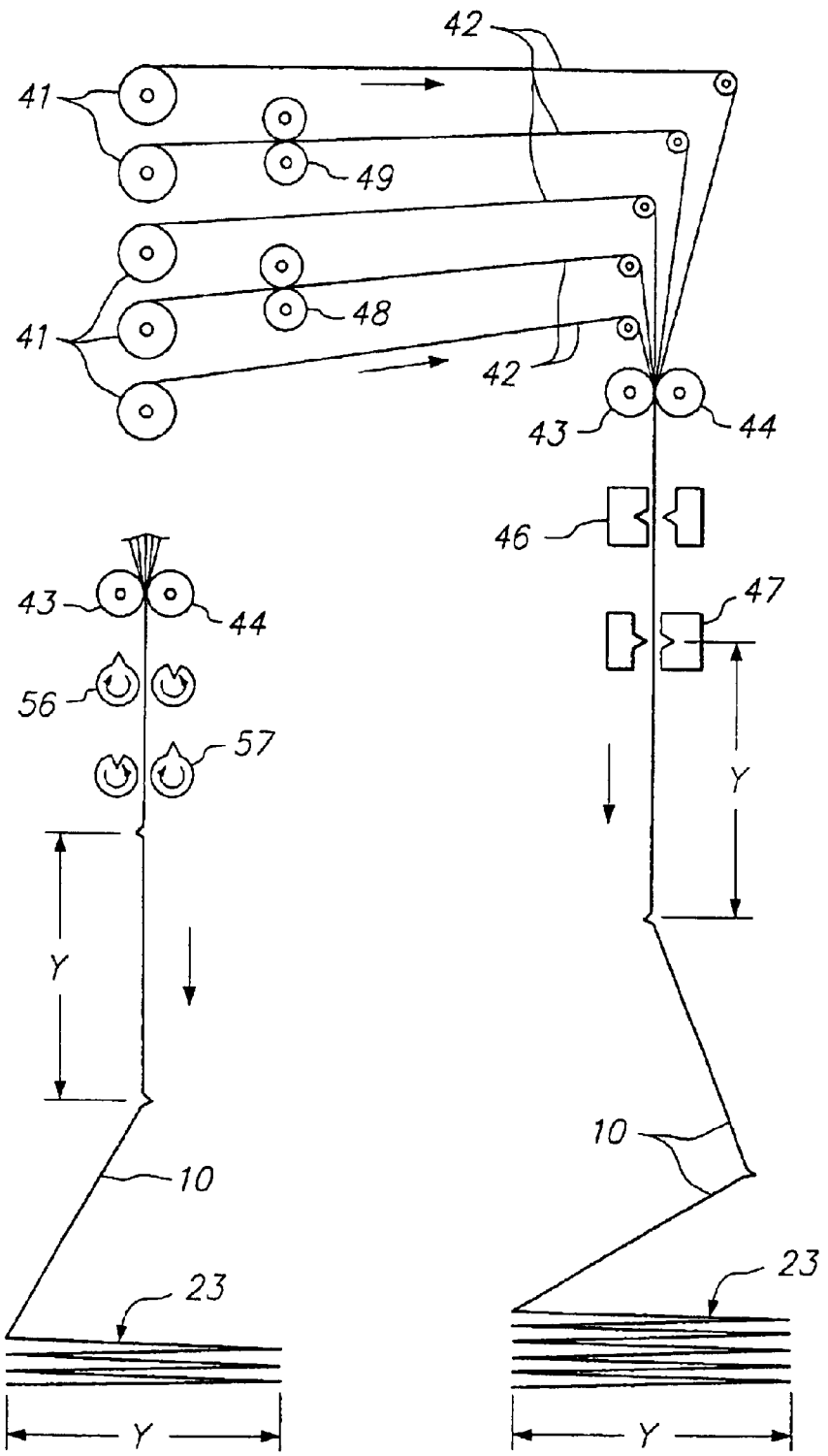
FIG. 2 illustrates the aspect of this invention wherein multiple metal foil layers are formed into a continuous stack which is then creased and folded in order to pile the multilayer metal foil stack in a zigzag fashion in order to form a z-fold pack of multilayer metal foil stack of materials.
FIG. 3 illustrates an alternative method and apparatus for scoring or creasing the multilayer material for folding into the z-fold pack.

FIG. 2 illustrates another important aspect of the present invention wherein multiple layers of metal foils 42 are supplied from rolls of metal foil 41 which are fed to the collection slot being the space between rollers 43 and 44 to form a multilayer stack 10 of metal foil layers. Stack 10 is then advanced through creasing or scoring tools 46 and 47 to impart to the multilayer metal foil stack 10 a score or crease across at least a portion of the width of stack 10, which scores or creases alternate in left and right directions, as illustrated in FIG. 2 at scoring tools 46 and 47. Scoring or creasing tools 46 and 47 are activated at desired alternating intervals to provide length Y between alternating crease or score directions, thus resulting in the multilayer metal foil stack 10 bending at the respective creases in alternating directions in a zigzag fashion and forming a z-fold pile of the multilayer stack as the stack is advanced. The length Y of the z-fold pack 23 will be determined by and is equal to the length Y between the scores or creases imparted to the advancing continuous multilayer stack of metal foils imparted by tools 46 and 47 for that purpose. The z-fold pack 23 provides a novel form of the multilayer stack of metal foils, which has various utilities as a feed stock or raw material for various manufacturing operations making multilayer parts of metal foils or metal foils and fiber layers. The z-fold pack 23 enables the efficient shipping and storage of a supply or inventory of multilayer stacks of metal foils of various properties and types without the necessity of storing large rolls of foil or rolls of fiber material. When needed for manufacturing a particular part, the z-fold pack 23 provides a readily available source of continuous feed stock of a preassembled, ready-to-use stack of the desired metal foil layers, with or without optional fiber, plastic, scrim, adhesive, metal sheet, etc., layers, from which the part forming or stamping manufacturing operation can produce parts on a continuous basis.

As will be appreciated by one skilled in the art, in reference to FIG. 2 and in reference to the disclosure herein as well as the disclosures of the patents and patent application referred to above, the number of layers of metal foil and other materials can vary from two to any desired number depending on the end use to which the z-folded pack of multilayer metal foil stack material will be utilized. For example, all layers may be smooth metal foil layers, metal foil layers can alternate with fibrous layers or with adhesive or other layers such as plastic film or adhesive film. Alternatively, all layers can be metal foil layers which are textured or corrugated which can result in an "all-metal" heat shield, or insulation parts formed from the multilayer stack 10, and may optionally be supplemented by one or more metal sheet layers for structural purposes.

FIG. 3 is an illustration similar to FIG. 2 but illustrating a different mechanism and tool for imparting the score or crease across at least a portion of the width of the multilayer stack 10. As illustrated in FIG. 3, rotating members 56 and 57 having a respective male and female portion can be positioned so that the multilayer stack 10 passes between the respective members 56 and 57, which are stationary, except when they are respectively periodically activated and rotated one revolution at predetermined intervals to produce the alternating score or crease across the substantial width of the multilayer stack 10 and intervals Y which then produce a z-fold pile having a length having a length Y when piled in the form of stack 23. It will be apparent that, depending on the characteristics of the multilayer stack 10 being utilized to make the z-fold pack 23, the alternating scoring or creasing need only be enough to cause the stack 10 to fold in the desired zigzag form at the desired intervals to produce the z-fold pack having the desired length Y. In some instances the scoring or creasing may need to only be at the edges of the width of stack 10, while in other instances it may need to be at numerous points across the width of stack 10, or even a continuous scoring or creasing across the entire width of stack 10, in order to achieve the desired alternating folding to produce the desired z-fold pack 23. In some instances the scoring or creasing may need only to be the top layer of the multilayer stack 10 or in some instances several but not all the layers of stack 10. So long as the multilayer stack 10 folds in alternating directions to form the z-fold pack, the scoring or creasing can be kept at a minimum amount across the width and a minimum penetration of layers of stack 10.

The z-fold pack 23 produced by the methods and apparatus illustrated in FIGS. 2 and 3 have unique properties and unique utility as a feed-stock for part-forming processes as illustrated in FIG. 1 and described above.

The z-fold pack 23 of continuous multilayer stack 10 of metal foil layers has many advantages and utilities in the manufacture of multilayer metal foil parts and products. For example, when multilayer metal foil parts are made for automotive use and are made in one location and must be shipped to the automotive assembly location, it is inefficient in that the parts are bulky, take a tremendous volume of space for shipping and are subject to damage during shipment. Similarly, it is impractical to transport and store rolls of metal foil raw materials for fabrication into the final parts at or near the automotive assembly facility.

Figure 4:
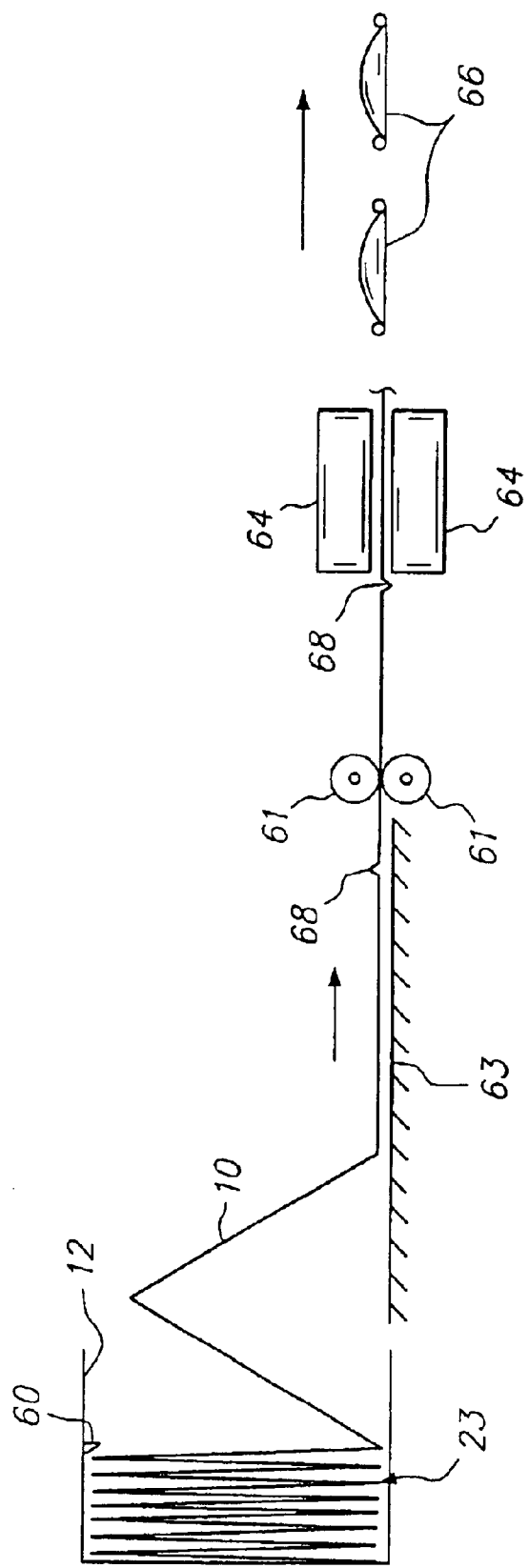
FIG. 4 illustrates an aspect of this invention wherein individual multilayer metal foil parts are formed using as the raw material or feed stock, a z-fold pack of continuous multilayer stack of metal foil layers.

The method and apparatus of this invention as exemplified in FIGS. 2 and 3 produce a new and useful unique product in the form of a z-fold pack 23 of the continuous stack of multilayer metal foils which is useful as a feedstock in processes to manufacture formed individual parts as illustrated in FIG. 1. The z-fold pack 23 of the folded multilayer metal foil stack 10 can achieve various efficiencies depending on the type of metal foils in the multilayer stack 10, as well as other layers such as fibers, adhesives, etc. By way of illustration, it is pointed out that multilayer metal foil products, such as 26 in FIG. 1, are usually designed for specific performance based on number of metal foil layers, thickness of each layer, the texture of each layer, whether embossed, corrugated, or otherwise. An object of this invention is to provide methods and apparatus for the most efficient shipping of a z-fold pack 23 to provide appropriate feedstock on a continuous basis to a part-forming operation such as illustrated in FIG. 1. By way of an example illustration, it may be pointed out that in a container, such as container 12 in FIG. 1, if formed and shaped parts 26 are shipped in such a container, the space required for a given number of parts 26 would be in terms of vertical inches. In contrast, by utilizing the z-fold pack 23 made according to the methods and apparatus of this invention as illustrated in FIGS. 2 and 3, a large amount of multilayer material can be shipped very compactly, which can be determined in folds of the multilayer stack per vertical inch in a container 12. The density of the pack 23 of the multilayer z-folded multilayer stack 10 will be governed by the manufacturing facility and process which will utilize the z-fold pack 23, i.e., whether the manufacturing facility producing the parts from the z-fold pack 23 of the multilayer stack 10 will have embossing or corrugating or other processing capabilities. If the manufacturing facility only has stamping and cutting capability, then the z-fold pack 23 will by necessity contain a continuous stack of embossed or corrugated or otherwise textured multilayer stack 10. In this case, each layer will have been individually embossed or corrugated prior to being assembled into the continuous multilayer stack 10. In the case of typical embossments of a five-layer 2 mil aluminum foil stack when formed into the z-fold pack 23 in accordance with the method and apparatus of this invention such as illustrated in FIGS. 2 and 3, a container 12 containing z-fold pack 23 will contain about 5 folds of multilayer stack 10 per vertical inch. In contrast, if the five layers of 2 mil aluminum foil are all fed in a flat five-layer stack to a single embosser and are embossed with a single embossment pattern to provide an embossed, nested, multilayer stack 10, which then will be separated at the manufacturing facility as illustrated in FIG. 1 before being constituted into a final multilayer stack 22 to produce final parts, such a five-layer stack 10 when z-folded to form z-fold pack 23 can result in about 20 folds per vertical inch in a container 12. Thus, it can be seen that the shipping density in a given container is much greater when a z-fold pack can be used for this configuration of the multilayer stack 10 of metal foils, due to the manufacturing capability at the part-forming operation. Similarly, if the multilayer stack 10 of metal foils is simply five smooth and flat layers of 2 mil aluminum foil z-folded into pack 23, as illustrated in FIGS. 2 and 3, it is estimated that such multilayer aluminum foil stack 10 can be packed in the z-fold pack 23 at about 100 folds per vertical inch in container 12 of FIG. 1. Thus, the efficiency and advantage of the z-fold pack 23 of this invention can be seen. Such a high density z-fold pack of multilayer metal foil feedstock for a parts manufacturing operation can be provided in a pallet form with a continuous supply of material for parts-forming operations, such as illustrated in FIGS. 1 and 4 or other part-forming operations. The z-fold pack provided by the present invention provides a more efficient way of supplying continuous multilayer metal foil feedstock than, as indicated above, transporting, handling and storing of individual rolls of metal foil at the parts manufacturing facility.

FIG. 4 illustrates an additional configuration in which the z-fold pack 23 of multilayer metal foil stack 10 can be efficiently utilized according to the present invention. In FIG. 4 it is illustrated that the draw of multilayer stack 10 from z-fold pack 23 and container 12 for use in manufacturing operations is not required to be vertical as illustrated in FIG. 1, but can be horizontal as illustrated in FIG. 4. The horizontal draw of the continuous multilayer metal foil stack 10 from stack 23 and container 12 is more suitable in many manufacturing operations. In such a manufacturing process, the z-fold pack of multilayer stack 10 is simply pulled horizontally from container 12, which has been rotated to lie on its side to enable the horizontal deployment of the z-folded stack 10 from pack 23. In such a configuration, the multilayer stack 10 can slide on a support 63 through rollers 61, which feed the multilayer stack 10 to the forming and cutting tool 64, which produces parts 66. In such a configuration, the z-folds of stack 10 can be prevented from collapsing out of container 12 by either setting container 12 at a slight angle or providing a retainer 60 at the top of the z-folds to allow only one z-fold to exit container 12 at any single time as demanded by the draw of the multilayer stack 10 through rollers 61. Another aspect of this invention is illustrated in FIG. 4, wherein it can be seen that the scores or creases 68 resulting from the z-fold configuration of multilayer stack 10 can be configured so that they do not interfere with the formation of parts such as parts 66. In many operations, the creases or scores 68 will be formed into the final parts with no consequence. However, if it would be detrimental to the final part 66 to have a crease or score 68 in some area of the part, the crease or score 68 can be positioned so that it is in the scrap area adjacent to the part when the part is cut from the multilayer metal foil stack 10.

The materials useful in the multilayer stacks of this invention will be apparent to one skilled in the art and will include typically aluminum, stainless steel, copper, and other metal foils and metal sheets, plastic coated metal foils and sheets, laminates of metals, alloys of these and other metals, and metallic materials which are plastically deformable and are permanently deformable. In addition to metal, other materials may be interlayered between two or more of the metal foil layers of the multilayer structure of this invention. For example, plastic films, metalized polymeric films, adhesive layers, spray on adhesives, coatings, etc., may be included in place of or between metal foil layers, particularly in acoustic applications where additional sound damping is desired. The thickness of the various metal and other layers employed will depend on the end use application. It is preferred that the multilayer structure be made primarily of metal foils having a thickness of 0.006 in. (6 mil) or less and in particular it is preferred that in, for example, a five layer structure, at least the three interior layers are thin metal foils, for example 0.002 in. (2 mil) thick metal foils. The exterior layers of an all-foil or all-metal stack are frequently desired to be heavier metal foils of 0.005 in. or 0.006 in. in thickness. Likewise, when the exterior layers are desired to function as protective or structured layers, they may be metal sheets of 0.010 or even up to 0.050 in. in thickness. In this regard, it is also recognized that the multilayer metal structures of this invention can be a non-foil structure made partially or entirely of layers of metal sheets thicker than metal foils, i.e., metal sheets having thicknesses in excess of 0.006 in. Thus, any metal foil layer described herein can be a metal sheet layer or can be other material such as polymeric, fibrous, etc.

The number of layers in the multilayer stack and the thicknesses of each layer will be selected by one skilled in the art depending on the flexibility desired, the vertical strength required in the final part or product, the capacity for lateral heat transfer, the requirements for sound damping, etc. The thickness of various metal foil layers may vary from 0.0008 to 0.006 in., with the 0.002 in. and 0.005 in. metal foils being preferred for many applications. When heavier sheets are used and in particular for the top sheets or protective exterior sheets, the metal sheets can have a thickness of greater than 0.006 in. up to about 0.050 in., with the preferred top sheets or exterior sheets having a thickness of 0.010 in. to about 0.030 in. Some examples of combinations of number of layers and thicknesses of the alternating corrugated and separation layers used in forming the multilayer metal foil structures of this invention are: (in mils, 1 mil=0.001 in.) 2/2; 2/5; 2/2/5; 2/8; 10/2/5; 2/2/5/5; 5/0.8/0.8/5; 10/2/2/5; 10/2/2/2/5; 5/2/2/2/5; 2/2/2/2/2/5; 5/2/2/2/2/10; 8/2/2/2/4; 10/2/2/10; 5/2/2/10; 5/0.8/0.8/5; and 10/2/0.8/0.8/2/5. Examples of non-foil metal sheet structures are: 10/30; 10/10/50; 10/8/8/8; 30/10/10/10/30; 8/8/8; and 50/8/8/10. The foil and sheet materials useful in this invention are similar to those disclosed in U.S. Pat. No. 5,958,603; U.S. Pat. No. 5,939,212 and PCT Application Publication No. WO 98/44835, the disclosures of which are incorporated herein by reference. The above relative thicknesses of the layers can apply to metal/fiber/plastic/scrim/etc. combinations for use in the methods and products of this invention.

The multilayer stacks of metal foils useful in this invention will preferably have a total thickness from about 0.5 inch to about 1.0 inch or greater, depending on the number of layers, height of patterns such as embossments or corrugations, etc., desired for a particular shielding or insulating end use application. For example, a typical 5-layer stack having corrugated layers will have a total thickness of between about 0.75 and 1.0 inch, preferably between about 0.8 and 0.9 inch. Similar thickness may be employed in such a 5-layer structure with an exterior layer added as the sixth layer. A typical corrugation height (thickness of a single corrugated layer) will be between about 0.1 and 0.5 inch and preferably between about 0.2 and 0.4 inch. A typical embossment height will be between about 0.010 and 0.1 inch, preferably between about 0.020 and 0.080 inch, with 0.050 inch being a typical embossment height, which will result in a five-layer embossed stack having a total thickness of between about 0.2 and 0.5 inch.

The fiber materials useful in the multilayer stacks of this invention include conventional fibrous layers including polyester, aramid, fiberglass, paper and other fibrous materials which provide desired heat or sound insulation properties. Examples of such fiber-containing multilayer stacks are disclosed in U.S. Pat. Nos. 5,658,634 and 5,767,024, the disclosures of which are incorporated herein by reference. One skilled in the art will recognize from the drawings and disclosure herein the unique advantages provided by the combination of metal layers and fiber or other layers, as well as layers of other materials as suggested above, including plastics, metalized films, etc.

In the aspect of this invention related to forming the multilayer stack into a z-fold pack as illustrated in FIGS. 2 and 3 and the utilization of that z-fold pack of multilayer stack of material as a feedstock in manufacturing operations as illustrated in FIGS. 1 and 4 of this application, will preferably be practiced with preferred stacks of materials such as five-layer or seven-layer stacks of metal foils, or metal foils in combination with layers of other materials such as fiber layers, plastic layers, adhesive layers and the like. However, it will be recognized that the scope of the present invention may be utilized with multilayer stacks of materials ranging from two metal layers to as many layers as is appropriate for a particular product design and may be utilized using a single metal layer in combination with a layer of fiber material, plastic material, etc., in order to form the z-fold pack as illustrated in FIGS. 2 and 3, then utilize the z-fold pack in manufacturing operations to produce formed individual parts as illustrated in FIGS. 1 and 4. It will also be recognized that some of the layers in the multilayer stack may be discontinuous or have gaps in the layers. For example, in reference to FIG. 1, it will be recognized that the layers 15 which are corrugated by corrugating tools 18 and 19 will be shortened in length compared to the flat layers which are not significantly corrugated or patterned to likewise shorten those layers in length. Consequently, layers 15 may be cut in segments to feed into the slot between rollers 20 and 21. However, the gaps between the ends of segmented layers 15 can be coordinated with the stamping of the products in tool 24, so that the gaps in discontinuous layers 15 occur between the product stampings and do not affect the quality or performance of final products 26. Thus, it can be seen that one skilled in the art can devise various combinations of materials, segmented layers, etc., provided that the overall structure of the multilayer stack is capable of being formed into the z-fold pack as illustrated in FIGS. 2 and 3 and can then be pulled from the pack and utilized in manufacturing operations as illustrated in FIGS. 1 and 4.

Another advantage provided by the present invention involves the separate use of embossing tools such as 48 and 49 in FIG. 2 which can typically run much faster, such as three times the lineal rate than can part-forming and stamping operations as illustrated by tool 24 in FIG. 1. The present invention thus provides the advantage of enabling less investment in corrugating tools to form multilayer corrugated or embossed layers, which can be run at high speed and stockpiled in the form of the z-fold pack 23. Then the z-fold pack 23 can be utilized at a slower production rate in feet per minute through the part-stamping and forming operations illustrated in FIGS. 1 and 4. Prior to this invention, the embossing or corrugating tools were positioned in line to feed directly into a part-forming or part-stamping operation, thus requiring capital investment of embossment or corrugating tools for each part-forming line. Utilizing the present invention, a single embossing or corrugating tool can be used to produce the z-fold pack 23 and ultimately, provide multilayer stack feedstock to as many as three product-forming production lines for one embossment or corrugating tool. As will also be apparent to one skilled in the art, following the disclosure of the present application including the drawings, the size of the z-fold pack 23 can be adjusted for any desired size, depending on container 12 of FIG. 1 and FIG. 4, and is limited only by the size that can be accommodated by the length Y and height of the z-fold pack 23. Typically with multilayer metal foil stacks formed into the z-fold pack 23, weight per container is not a limiting factor, whereas volume of container 12 will usually be the limiting factor on capacity.

Other variations of the methods of making and utilizing the z-fold pack of multilayer metal foil stacks according to the present invention will be apparent to one skilled in the art following the teachings of this disclosure.

What is claimed is:

1. A method of forming a multilayer metal foil product comprising
   providing a continuous stack of metal foil layers;
   separating at least two of the layers of the stack;
   imparting a pattern or surface treatment to at least one of said separated layers of metal foil;
   recombining the separated metal foil layers into a continuous stack of metal foil layers; and
   forming and cutting individual multilayer metal foil parts from said recombined continuous stack of metal foil layers.

2. A method according to claim 1 wherein the pattern imparted to said at least one layer of metal foil is embossments or corrugations.

3. A method according to claim 1 wherein the continuous stack of metal foil layers is provided from a z-fold pack.

4. A method according to claim 1 wherein the stack of metal foil layers comprises a fiberous layer between two metal foil layers.

5. A method according to claim 1 wherein the surface treatment comprises an adhesive applied to a surface of said at least one layer of metal foil.

6. A method according to claim 1 wherein the stack of metal foils comprises a metal sheet layer.

7. A method according to claim 2 comprising providing a stack of metal foil layers having at least one layer having a preexisting embossed pattern and imparting to at least one separated layer of metal foil a pattern of corrugations before recombining the layers into the continuous stack.

8. A method according to claim 2 comprising providing a stack of metal foil layers having all the layers embossed and nested and imparting to at least one separated layer a pattern of corrugations before recombining the layers into the continuous stack.

9. A method according to claim 7 comprising providing a stack comprising five metal foil layers comprising three embossed metal foil layers and two smooth metal foil layers positioned one between each pair of embossed metal foil layers and imparting a pattern of corrugations to each of the two smooth metal foil layers before recombining the five metal foil layers into the continuous stack.

10. A method of forming a multilayer metal foil product comprising
    providing a continuous stack comprising patterned and nested metal foil layers;
    separating at least two of the nested layers of the stack;
    recombining the separated metal foil layers into a continuous stack of the metal foil layers in a manner to prevent the layers from nesting; and
    forming and cutting individual multilayer metal foil parts from said recombined stack of metal foil layers.

11. A method according to claim 10 comprising imparting an additional pattern or a surface treatment to at least one of said separated layers of metal foil.

12. A method according to claim 10 wherein the pattern imparted to said at least one layer of metal foil is embossments or corrugations.

13. A method according to claim 10 wherein the continuous stack of metal foil layers is provided from a z-fold pack.

14. A method according to claim 10 wherein the stack of metal foil layers comprises a fiberous layer between two metal foil layers.

15. A method according to claim 10 wherein the surface treatment comprises an adhesive applied to a surface of said at least one layer of metal foil.

16. A method according to claim 10 wherein the stack of metal foils comprises a metal sheet layer.

17. A method of producing multilayer metal foil parts comprising:
feeding to a parts forming operation a continuous previously patterned multilayer stack of spaced apart metal foil layers from a z-fold pack of a continuous previously patterned multilayer stack of spaced apart metal foil layers; and
forming and cutting individual multilayer metal foil parts from said stack of spaced apart metal foil layers.

18. The method according to claim 17, wherein at least one of said metal foil layers is embossed or corrugated.

19. The method according to claim 17, further comprising at least one fiber layer.

20. The method according to claim 17, wherein a draw of the continuous previously patterned multilayer stack of spaced apart metal foil layers from the z-fold stack is horizontal.

21. The method according to claim 17, wherein a draw of the continuous previously patterned multilayer stack of spaced apart metal foil layers from the z-fold stack is non-vertical.

* * * * *